United States Patent
Glück et al.

(10) Patent No.: US 11,702,062 B2
(45) Date of Patent: Jul. 18, 2023

(54) MHEV OPERATING STRATEGY FOR OPTIMIZED DRIVING DYNAMICS

(71) Applicant: AUDI AG, Ingolstadt (DE)

(72) Inventors: Christian Glück, Ingolstadt (DE); Viktor Kell, Neustadt (DE)

(73) Assignee: AUDI AG, Ingolstadt (DE)

( * ) Notice: Subject to any disclaimer, the term of this patent is extended or adjusted under 35 U.S.C. 154(b) by 327 days.

(21) Appl. No.: 17/239,868

(22) Filed: Apr. 26, 2021

(65) Prior Publication Data

US 2022/0024444 A1 Jan. 27, 2022

(30) Foreign Application Priority Data

Jul. 24, 2020 (DE) .......................... 102020119554.0

(51) Int. Cl.
*B60W 20/20* (2016.01)
*B60K 6/28* (2007.10)
*B60K 6/26* (2007.10)
*B60L 7/10* (2006.01)
*B60K 6/485* (2007.10)

(52) U.S. Cl.
CPC .............. *B60W 20/20* (2013.01); *B60K 6/26* (2013.01); *B60K 6/28* (2013.01); *B60K 6/485* (2013.01); *B60L 7/10* (2013.01); *B60Y 2200/92* (2013.01); *B60Y 2300/182* (2013.01); *B60Y 2400/112* (2013.01)

(58) Field of Classification Search
CPC ...... B60W 20/20; B60W 20/15; B60W 20/14; B60W 30/1843; B60K 6/26; B60K 6/28; B60K 6/485; B60L 7/10; B60L 58/20; B60L 58/25; B60Y 2200/92; B60Y 2300/182
See application file for complete search history.

(56) References Cited

U.S. PATENT DOCUMENTS

| | | | |
|---|---|---|---|
| 2011/0115288 A1* | 5/2011 | Lee | B60K 6/485 180/65.285 |
| 2014/0067183 A1 | 3/2014 | Sisk | |
| 2014/0200756 A1 | 7/2014 | Sisk | |
| 2018/0072305 A1* | 3/2018 | Choi | B60W 10/11 |
| 2022/0009477 A1* | 1/2022 | Lee | B60W 30/18127 |

FOREIGN PATENT DOCUMENTS

| | | | |
|---|---|---|---|
| CN | 108528224 A * | 9/2018 | .......... B60L 15/2009 |
| DE | 102013225677 A1 | 6/2015 | |
| DE | 102016222827 A1 | 5/2018 | |

OTHER PUBLICATIONS

German Examination Report dated Mar. 17, 2021 in corresponding German Application No. 102020119554.0; 12 pages; Machine translation attached.

* cited by examiner

*Primary Examiner* — George C Jin
(74) *Attorney, Agent, or Firm* — Maier & Maier, PLLC

(57) ABSTRACT

An operating strategy optimized for dynamic requirements for 48V drive systems of MHEV.

20 Claims, No Drawings

MHEV OPERATING STRATEGY FOR OPTIMIZED DRIVING DYNAMICS

FIELD

The present invention relates to an operating strategy optimized for dynamic demands for 48V drive systems of MHEV.

BACKGROUND

Mild hybrid vehicles (MHEV—Mild Hybrid Electric Vehicle) comprise an internal combustion engine and a medium-power electric drive that assists the internal combustion engine when accelerating and driving. In general, electrical drive systems having an operating voltage of 48 V are used. Mild hybrid systems are used to reduce fuel consumption. For this reason, the electrical drive is designed for maximum recuperation power with a relatively low average motor output power.

However, as soon as both high recuperation power and high boost power are required at the same time, for example on a race track, where there is either strong acceleration (=boost) or deceleration (=recuperation), due to the resulting power loss in the 48 V battery, thermal derating of the battery, i.e., a decrease in the maximum performance of the battery, is to be expected after a short time. With an operating strategy in which the recuperation of braking energy is always implemented up to the permissible current limit, the 48 V battery becomes too hot. Thermal derating results in a reduction in the boost power, which worsens the driving dynamics. Present MHEV systems can therefore only use the system performance to a limited extent to improve the driving dynamics.

An energy storage system of a motor vehicle is known from US 2014/067183 A1, which comprises an energy storage unit, a controller coupled to the energy storage unit, one or more sensors for detecting current levels, voltage levels, temperature levels, and/or pressure levels of the energy storage unit, and a control unit that is configured to dynamically determine an energy flow into or out of the energy storage unit using a fuzzy logic approach. The regulator is configured in such a way that it regulates a voltage level, a current level, and an additional state parameter of the energy storage unit. By applying fuzzy logic, two energy storage units are operated via a converter in such a way that both SOC and energy are optimally distributed for the driving task.

US 2014/0 200 756 A1 relates to a system for electrically storing regenerative energy of a vehicle. The system includes a first energy storage unit, a second energy storage unit, an energy regulator that is coupled to the first and second energy storage units, a source of regenerative energy that captures energy regenerated during a regenerative energy event of the vehicle, and a control unit that is coupled to the energy regulator. The control unit is configured to use the energy regulator to transmit electrical energy from the first energy storage unit to the second energy storage unit, based on a prediction of a regenerative power event. The transmission of the electrical energy is used to reduce the electrical energy stored in the first energy storage unit, whereby the first energy storage unit can receive regenerated electrical energy when the predicted regenerative energy event occurs.

SUMMARY

Against this background, the invention has the stated object of providing a method and a device which make it possible to use the power of the electrical energy system of an MHEV without restriction, even over a longer period of time, to improve the driving dynamics.

DETAILED DESCRIPTION

According to the invention, thermal derating of the 48 V battery of the energy system of an MHEV is avoided by reducing the recuperation power and by permanently increasing the load point (generator mode) to ensure the charge balance during dynamic driving situations (for example a race track) in order to be able to provide full boost power over the long term.

The invention relates to a method for controlling an electrical energy system of an MHEV. The electrical energy system comprises a 48 V energy storage unit and at least one electrical machine that operatively interacts with at least one wheel or at least one axle of the MHEV. The electrical machine can operate as a motor and assist the drive of the vehicle by providing additional drive power (boost power), or it can be used as a generator to generate electrical energy that is stored in the 48 V energy storage unit. The generator mode of the electrical machine can be used during traction phases of the vehicle to charge the energy storage unit or to convert kinetic energy into electrical energy during braking processes (recuperation brake).

According to the invention, the full drive power of the electrical machine is used to assist the drive during a boost phase, the recuperation power of the electrical machine is limited during a braking phase, and the electrical machine is operated in generator mode under partial load during a traction phase in order to compensate for the requested boost power and to charge the 48 V energy storage unit. The generator mode increases the load point of the ICE.

The cooling capacity required to cool a 48V battery follows simple physical relationships. $I^2*R$ determines the power loss, power loss divided by the heat transfer coefficient results in the required flow temperature of the cooling medium of the battery, for example water. The flow temperature cannot drop below 3° C. in the case of water cooling.

The current is therefore incorporated in the power loss as a dominant square. A high current during boost phases is desired and should be implemented. In order to reduce the average load on the battery, the current load, which is also high, is therefore reduced by recuperation and the energy balance is balanced out via moderate to low charging currents in the generator mode. This is to be illustrated by a calculation example:

A standard operating strategy using boost and full recuperation, for a fictitious cycle of 1000 s, in which 350 s take place on traction phases (averaged electrical power 0 kW), 250 s take place on traction phases with boost (averaged electrical power 20 kW), and 300 s take place on recuperation phases (averaged electrical power 16.67 kW), a total battery current $I_{RMS}$ of 305.48 A results.

In contrast, for the optimized strategy using reduced recuperation and additional generator mode to optimize power loss, for the fictitious cycle of 1000 s, in which 350 s take place on traction phases with generator mode (averaged electrical power 7.5 kW), 250 s take place on traction phases with boost (averaged electrical power 20 kW), and 300 s take place on recuperation phases (averaged electrical power 7.9 kW), a total battery current $I_{RMS}$ of 276.96 A results.

By reducing the recuperation power in favor of increasing the load point, the total battery current $I_{RMS}$ thus drops significantly.

Transferred to the requirements for the cooling system of a 48 V battery having $10^{-2}\Omega$ internal resistance, a heat transfer coefficient of 15 W/K, and a cell limit temperature of 60° C., the following results:

In a standard operating strategy using boost and full recuperation, a power loss of 933 W results, which requires a temperature difference of 62 K between the cell and the flow. The flow temperature therefore has to be −2° C. Since the flow temperature cannot drop below 3° C. in the case of water cooling, the power loss is not fully compensated for by cooling. The battery will overheat and thermal derating will occur.

In contrast, the optimized strategy using reduced recuperation and additional generator operation to optimize power loss results in a power loss of only 767 W, which requires a temperature difference of 51 K between the cell and the flow. The flow temperature therefore has to be +9° C. in order to fully compensate for the occurring power loss. Thermal derating can be prevented using the optimized strategy.

To avoid overheating of the 48 V battery, according to the invention, the recuperation power of the at least one electrical machine is limited during a braking phase and the at least one electrical machine is operated in generator mode under partial load during a traction phase.

In one embodiment of the method, the recuperation power of the at least one electrical machine is limited to not more than 50%, for example not more than 40%, of the maximum recuperation power of the electrical machine.

In a further embodiment of the method, in generator mode, the output power of the at least one electrical machine is limited to not more than 50%, for example not more than 40%, of the maximum electrical output power of the at least one electrical machine.

In one embodiment of the method, the recuperation power is limited and the power is limited in the generator mode as a function of the requested boost power. The higher the requested boost power and the longer the duration of the boost phase, the more strongly the recuperation power and generator power have to be limited in order to prevent the 48 V battery from overheating. In order to compensate for the lower charging power, the at least one electrical machine has to be operated as a generator for a correspondingly longer period of time during the traction phases so that the 48 V battery is always sufficiently charged.

In one embodiment, the method according to the invention is carried out when a driving situation is detected having increased demands on the driving dynamics. In one embodiment, a driving situation having increased demands on the driving dynamics is recognized on the basis of the selection of a corresponding drive level (for example "S").

In one embodiment of the method according to the invention, the output boost power is monitored via an observer function and if the average value of the output boost power falls below a specified limit value, the generator mode is stopped during the traction phases and the limitation of the recuperation power is canceled.

The subject matter of the invention is also an electrical energy system of an MHEV, comprising a 48 V energy storage unit and at least one electrical machine that operatively interacts with at least one wheel or at least one axle of the MHEV, as well as a control unit which is configured, upon recognizing a driving situation having increased demands on the driving dynamics a) to provide the full drive power of the at least one electrical machine to assist the drive during a boost phase, b) to operate the at least one electrical machine as a recuperation brake during a braking phase, wherein it limits the recuperation power of the at least one electrical machine in relation to the maximum possible recuperation power, and c) to operate the at least one electrical machine in generator mode during a traction phase, wherein it limits the generator power of the at least one electrical machine in relation to the maximum possible generator power.

In one embodiment, the control unit recognizes a driving situation having increased demands on the driving dynamics on the basis of the selection of a corresponding drive level.

In a further embodiment, the control unit is configured to monitor the output boost power and, if the output boost power averaged over time falls below a specified limit value, to set the generator mode of the at least one electrical machine and to cancel the limitation of the recuperation power of the at least one electrical machine. The limit value is determined as a function of the maximum power loss that can be dissipated from the 48 V energy storage unit by cooling. If the maximum cooling capacity is greater than the power loss generated by boost and recuperation, it is not necessary to limit the recuperation capacity.

The solution according to the invention offers the advantage that, with recognized driving-dynamics situation, the optimized operating strategy can be used to permanently reduce the power loss of the battery to a level that can be compensated for by cooling the battery, without adapting the design of the system. The driving performance (dynamics) remains at the same high level, the charge balance remains balanced.

Further advantages and embodiments of the invention result from the description. It is apparent that the above-mentioned features are usable not only in the particular specified combination but rather also in other combinations or alone, without leaving the scope of the present invention.

The invention claimed is:

1. A method for controlling an electrical energy system of an MHEV, which comprises a 48 V energy storage unit and at least one electrical machine which operatively interacts with at least one wheel or at least one axle of the MHEV, in which the full drive power of the electrical machine is used to assist the drive during a boost phase, during a braking phase the recuperation power of the electrical machine is limited, and during a traction phase the electrical machine is operated in generator mode under partial load.

2. The method according to claim 1, in which the recuperation power of the at least one electrical machine is limited to not more than 50% of the maximum power of the at least one electrical machine.

3. The method according to claim 1, in which the electrical output power of the at least one electrical machine is limited in generator mode to not more than 50% of the maximum electrical output power of the at least one electrical machine.

4. The method according to claim 1, in which the recuperation power is limited and the power is limited in generator mode as a function of the requested boost power.

5. The method according to claim 1, which is carried out when a driving situation having increased demands on the driving dynamics is recognized.

6. The method according to claim 5, in which a driving situation having increased demands on the driving dynamics is recognized on the basis of the selection of a corresponding drive level.

7. The method according to claim 1, in which the output boost power is monitored via an observer function and, if the mean value of the output boost power falls below a specified limit value, the generator mode is stopped during the traction phases and the limitation of the recuperation power is canceled.

8. An electrical energy system of an MHEV, comprising a 48 V energy storage unit and at least one electrical machine that operatively interacts with at least one wheel or at least one axle of the MHEV, as well as a control unit which is configured, upon recognizing a driving situation having increased demands on the driving dynamics
   a) to provide the full drive power of the at least one electrical machine to assist the drive during a boost phase,
   b) to operate the at least one electrical machine as a recuperation brake during a braking phase, wherein it limits the recuperation power of the at least one electrical machine in relation to the maximum possible recuperation power, and
   c) to operate the at least one electrical machine in generator mode during a traction phase, wherein it limits the generator power of the at least one electrical machine in relation to the maximum possible generator power.

9. An electrical energy system according to claim 8, in which the control device unit recognizes a driving situation having increased demands on the driving dynamics on the basis of the selection of a corresponding drive level.

10. An electrical energy system according to claim 8, in which the control unit is configured to monitor the output boost power and, if the output boost power averaged over time falls below a specified limit value, to set the generator mode of the at least one electrical machine and to cancel the limitation of the recuperation power of the at least one electrical machine.

11. The method according to claim 2, in which the electrical output power of the at least one electrical machine is limited in generator mode to not more than 50% of the maximum electrical output power of the at least one electrical machine.

12. The method according to claim 2, in which the recuperation power is limited and the power is limited in generator mode as a function of the requested boost power.

13. The method according to claim 3, in which the recuperation power is limited and the power is limited in generator mode as a function of the requested boost power.

14. The method according to claim 2, which is carried out when a driving situation having increased demands on the driving dynamics is recognized.

15. The method according to claim 3, which is carried out when a driving situation having increased demands on the driving dynamics is recognized.

16. The method according to claim 4, which is carried out when a driving situation having increased demands on the driving dynamics is recognized.

17. The method according to claim 2, in which the output boost power is monitored via an observer function and, if the mean value of the output boost power falls below a specified limit value, the generator mode is stopped during the traction phases and the limitation of the recuperation power is canceled.

18. The method according to claim 3, in which the output boost power is monitored via an observer function and, if the mean value of the output boost power falls below a specified limit value, the generator mode is stopped during the traction phases and the limitation of the recuperation power is canceled.

19. The method according to claim 4, in which the output boost power is monitored via an observer function and, if the mean value of the output boost power falls below a specified limit value, the generator mode is stopped during the traction phases and the limitation of the recuperation power is canceled.

20. The method according to claim 5, in which the output boost power is monitored via an observer function and, if the mean value of the output boost power falls below a specified limit value, the generator mode is stopped during the traction phases and the limitation of the recuperation power is canceled.

* * * * *